May 10, 1949.

J. RAZEK 2,469,744

TELEMETERING SYSTEM FOR TRANSMITTING
INDICATIONS OF MOVEMENTS

Filed Sept. 22, 1945

WITNESS:

Robt R Kitchel

INVENTOR

Joseph Razek

BY

ATTORNEYS.

May 10, 1949.

J. RAZEK 2,469,744

TELEMETERING SYSTEM FOR TRANSMITTING INDICATIONS OF MOVEMENTS

Filed Sept. 22, 1945

INVENTOR

Joseph Razek

BY

Busser Harding

ATTORNEYS.

WITNESS:

Robt R Kitchel.

Patented May 10, 1949

2,469,744

UNITED STATES PATENT OFFICE 2,469,744

TELEMETERING SYSTEM FOR TRANSMITTING INDICATIONS OF MOVEMENTS

Joseph Razek, Llanerch, Pa., assignor to Cochrane Corporation, Philadelphia, Pa., a corporation of Pennsylvania Application September 22, 1945, Serial No. 617,962

10 Claims. (Cl. 318—28)

This invention relates to a telemetering system, and has particular reference to a type of system utilizing high frequency oscillations provided by a crystal oscillator.

It is a well known characteristic of a crystal oscillator of conventional type that it will go into and out of oscillation with very small changes in constants of a tuned circuit of the oscillator. The present invention utilizes this characteristic to secure a sharp response of the system accurately related to the variable being transmitted.

An additional feature of the present invention is the use of a powdered iron core for inductance tuning. The advantage of the powdered iron core lies in the fact that it is possible to change the inductance in a tank circuit by means of a direct quite large motion of a powdered iron core whereas any attempt to change a capacity in any similar fashion requires reducing by mechanical means any large motion to be transmitted.

In accordance with the present invention, a powdered iron core may be directly moved in accordance with any motion which it is desired to transmit, for example, it may be attached directly to a float for measuring liquid level or flow, in the latter event the float being disposed in the flow so as to be variably movable. An example of a float so arranged would be that of a rotameter. Pressure differences may be transmitted by the utilization of a mercury manometer or the like, in which the iron core may be floated on the mercury so as to move in accordance with changes of the mercury level. Mechanical motions may be transmitted in obvious fashion by direct connection of any movable element to the variable core.

The foregoing general objects of the invention together with subsidiary objects, particularly relating to details of construction and operation, will be apparent from the following description read in conjunction with the accompanying drawing, in which.

Figure 1:
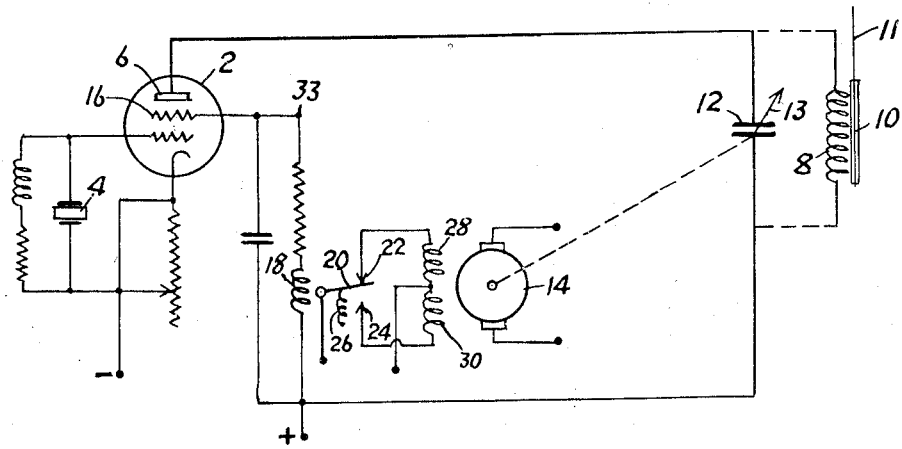
Figure 1 is a diagram showing one embodiment of the invention utilizing a single tube, crystal controlled oscillator.

Referring first to Figure 1, there is illustrated at 2 a vacuum tube of the screen grid type connected in a crystal controlled oscillator circuit. This circuit may be of quite conventional type and the constants of the elements used may be in accord with usual practice in the construction of a low power crystal controlled oscillator. Accordingly, reference need not be made to such details as the securing of necessary bias, the by-passing of resistances and other impedances, and the provision of the usual shunt for the crystal 4 which comprises, as usual, a radio frequency choke and grid leak. In the circuit of the plate 6 there is included a tank comprising an inductance 8 and a condenser 12. In accordance with the present invention, the inductance 8 is arranged to be variable tuned by a powdered iron core indicated at 10 and mechanically connected at 11 to partake of the motion which is to be telemetered. As indicated above, this powdered iron core may be moved in accordance with a mechanical motion to be transmitted, or may be moved by connection to an element or means responsive to some variable quantity, the value of which is to be remotely indicated. In general, the coil 8 and the core 10 will be remote from the other parts of the apparatus as is intended to be indicated by the dotted connections between the coil and the condenser 12. These connections may be by way of a twisted pair or any other suitable connection which itself will produce a substantially constant impedance in the tank circuit. In any event, the inductance of the coil and the capacity of the condenser will form a tuned circuit when considered in conjunction with the impedances of the connections between these elements. If it is assumed that the connections are short, their impedance values may be neglected for the purpose of visualizing the action of the circuit and it may be considered that the tank comprises a lumped capacity, substantially that of the condenser 12, in parallel with a lumped inductance substantially that of the coil 8 as controlled by the core 10.

In order to secure the telemetering response, a reversing motor 14 is connected (through suitable gearing or other means not indicated) to the condenser 12 to drive the rotary plates thereof. Connected to these rotary plates is a pointer 13 which may move in juxtaposition to a suitable scale.

The screen grid 16 has incorporated in its circuit the coil 18 of a sensitive relay, the armature 20 of which is arranged to make alternative contact with the points 22 and 24 which may be connected as indicated to the reversely wound field coils 28 and 30 of the motor 14. A spring 26 adjusts the armature 20 in a direction to make contact at 24 when the screen current drops below some predetermined value.

Accordingly, the screen current is made to control the direction of operation of the motor 14. It will be understood that the relay and reversing motor connections, as illustrated, are to be regarded only as an example, inasmuch as any other reversing motor system well known to the art may be utilized. Instead of utilizing the screen current directly, changes in the screen potential may be taken off, for example, at the point 33 to effect through an amplifying means, reversing control of a motor arranged to drive the movable elements of the condenser 12.

Figure 2:
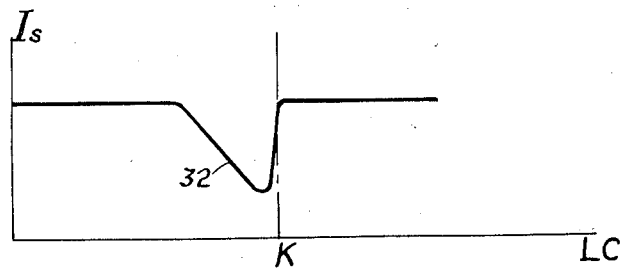
Figure 2 is a graph illustrating the screen current characteristic and the fashion in which the telemetering takes place.

The operation of the telemetering system described will be clear from consideration of Figure 2 which illustrates the variation of screen current with respect to the LC product of the tank circuit. As is characteristic of a crystal oscillator as the LC product of the associated tuned circuit is increased from a low value for which oscillation does not occure there is reached a point at which oscillation begins with an attendance sharp decrease in screen current. As the LC product further increases, there is ultimately reached a minimum value of screen current corresponding to the tuning of the tank circuit to the crystal frequency. When this LC product is exceeded, the value of screen current increases very sharply until oscillations cease. The plate current characteristic is very similar to the screen current characteristic which is described here. Furthermore, the amplitude of the oscillations produced is closely related to the dip of the screen current, maximum amplitude corresponding to the minimum value of screen (or plate) current. The plate current may be used instead of the screen current to control the operation of the motor, or, as hereafter pointed out, the high frequency oscillations appearing within the tank circuit or in the crystal circuit may also be utilized for control purposes. What is common to all of these is a very sharp change in response to variations in the LC product.

If now the rotation of the motor is so controlled that a decrease in the inductance of the coil 8 will be compensated by an increase in the capacity of the condenser 12 so as to maintain the LC product substantially constant, it will be evident that the position of the variable elements of the condenser will indicate, and correspond to, the position of the powdered iron core 10 which controls the inductance of the coil 8. Let it be supposed that the value of LC indicated at K corresponds to the value of screen current at which a shift of the relay position occurs to reverse the motor 14. If the LC product is increased by a movement of the core 10 to increase the inductance of the coil 8, the screen current will rise. This through the relay is caused to effect a rotation of the motor 14 in such direction as to decrease the capacity of the condenser 12. The condenser 12 accordingly decreases the LC product from its new value until there is again secured the value K at which the relay will be shifted to reverse the rotation of the motor. In view of the steep characteristic at K, it will be evident that the position assumed by the condenser will be very accurately related to the position of the core 10.

The system described, of course, has a hunting characteristic unless the relay is of a type sufficiently damped so that the armature 20 may occupy a position in which neither of the contacts at 22 and 24 is closed. It is readily possible to provide a relay lacking hunting characteristics, for example, if it is of a well damped d'Arsonval type. Stability may be achieved in this fashion so that the position of the variable elements of the condenser will indicate to a high degree of accuracy the position of the core 10. Accordingly, an indicating needle or pointer, such as indicated at 13, connected to the variable condenser plates will show on a suitable scale the variations to which the positions of the core correspond.

Figure 3:
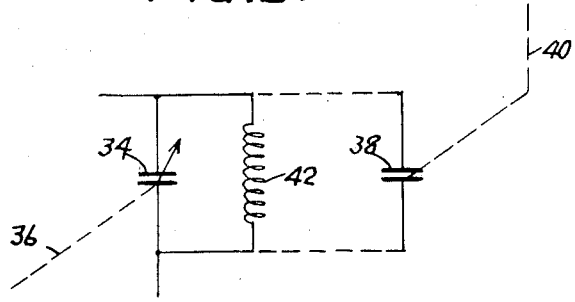
Figure 3 is a diagram of a tank circuit alternative to that of Figure 1 and illustrating the application of the invention to control due to the varying position of a condenser.

While, in view of the fact that a large motion of a core such as 10 may be utilized to secure a variation of inductance of the coil 8 through a working range, the use of such a core is highly desirable, it will be evident that the transmitting element may consist of a variable condenser as in Figure 3 which represents a tank circuit alternative to that of Figure 1. In this tank circuit, the condenser 34 corresponds to the condenser 12 and is connected as indicated at 36 to a reversing motor. The condenser 24 is shunted by a fixed inductance 42. The capacity of the tank circuit, however, not only includes the capacity of the condenser 24, but also the capacity of a condenser 38 connected in parallel with the condenser 24 through a line indicated by the dotted lines in Figure 3. This condenser 38 may have its variable plates connected through mechanical connections 40 to the source of the motion which is to be transmitted. The operation of this variation will be obvious from the foregoing description, the motor being again controlled so that, to secure a substantially constant value for the LC produce, the condenser 34 will, when equilibrium is established, take a position or value corresponding to that of the condenser 38, e. g., the sum of the capacities will be constant assuming the connecting line is short.

As would be evident from Figure 2, it would be possible, due to overrun of the motor, resulting from accidental causes, for the system of Figure 1 to cease to operate properly, in the event that the LC product decreases sufficiently below the value K for the screen current to rise on the left hand side of the dip 32 toward its value corresponding to cessation of oscillations. In that case, the condenser 12 would be driven through a complete revolution before stopping, of course, at the value K. To avoid this, it is preferable to employ a system having better directional control.

Figure 4:
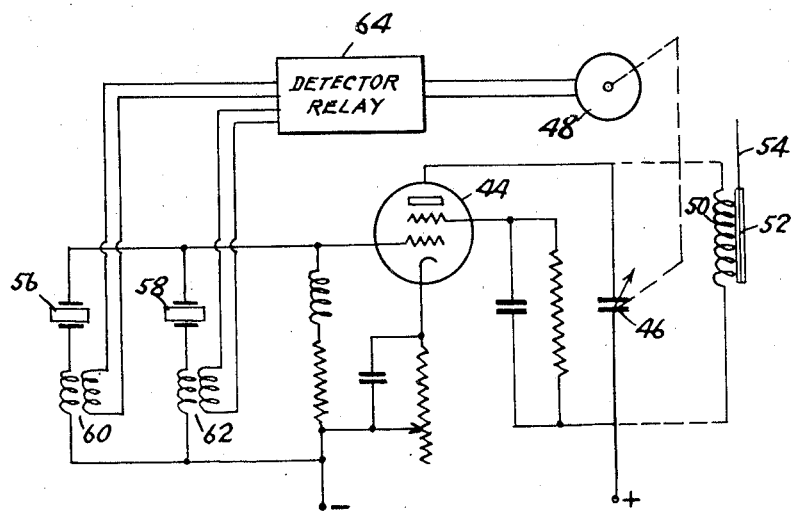
Figure 4 is a wiring diagram illustrating an embodiment of the invention involving a single tube subject to control by a pair of crystals.

Figure 4 represents such a system. In this system, a tube 44 is connected in an oscillating circuit embodying two crystals 56 and 58 arranged in parallel. As in the preceding system, however, the tank circuit comprises a condenser 46 in parallel with the coil 50, the inductance of which is varied by the powdered iron core 52 having a mechanical connection at 54 with the motion to be transmitted. The two crystals 56 and 58 have different natural frequencies, sufficiently spread so that for a given LC product corresponding to a frequency between the two crystal frequencies, neither will be oscillating. In other words, variation of the LC product above this value will cause one crystal to oscillate, while decrease below this value will cause the other crystal to oscillate. Desirably the changes of the LC product to cause one or the other to oscillate will be very small. To secure control by this system, radio frequency transformers 60 and 62 are arranged to transmit the high frequency crystal currents to a detector-relay element indicated at 64 which will control the motor 48 which drives the condenser 46 so that it will operate in one direction when the crystal 56 is oscillating and in the opposite direction when the crystal 58 is operating. The detector-relay construction will be evident to those skilled in the art as comprising no more than an element adapted to reverse the motor in response to the two high frequency currents which may be fed to rectifying or hot wire or other controls. The operation is essentially similar to that described above with the exception that now the condenser 46 will assume a position corresponding to the narrow range of the LC product in which the two crystals are not oscillating.

Figure 5:
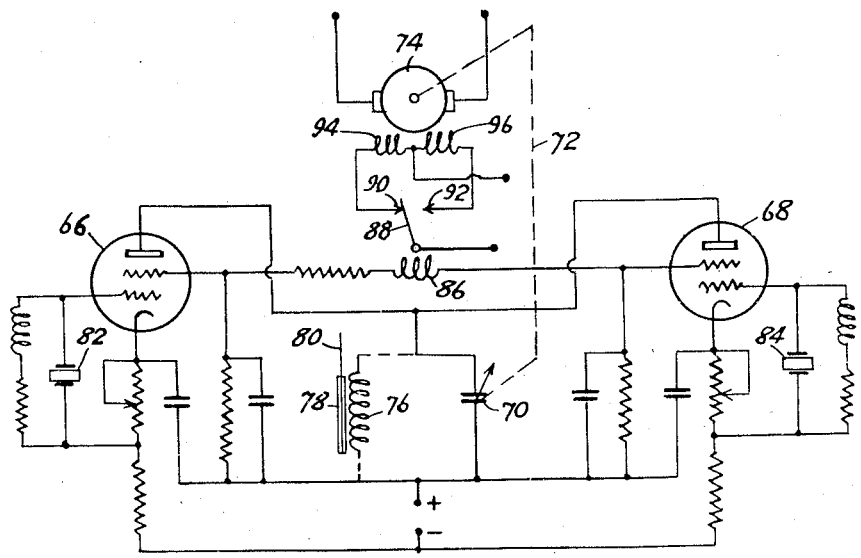
Figure 5 is a wiring diagram illustrating still another embodiment of the invention in which a pair of crystal controlled oscillators is utilized.

The system of Figure 4 is not, however, fully satisfactory, in view of the care which must be exercised in its design to secure stability of operation. The crystals must be adequately shielded from each other and the arrangement must be such as to prevent any considerable radio frequency current from passing through the capacity of the non-oscillating crystal holder. However, it will be obvious that when the circuit is oscillating at the frequency of one of the crystals, the oscillating crystal will be passing by far the greater percentage of the radio frequency grid current. Hence, it is possible to secure control as described. It is more desirable, however, to employ separate oscillating circuits. An embodiment of this type is illustrated in Figure 5.

Figure 7:
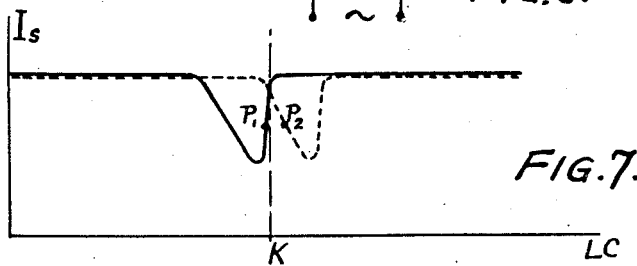
Figure 7 is a graph illustrating the screen current characteristics of the tubes of Figure 6 which in turn are related to the high frequency outputs thereof.

Tubes 66 and 68 desirably of screen grid type have a common tank connected to their plates which tank comprises the variable condenser 70 and the coil 76 which may be remotely connected thereto. The coil 76 is arranged to be tuned by a powdered iron core 78 having a mechanical connection at 80 with the motion to be transmitted. The grid circuits of the two tubes are, however, separate and contain the respective crystals 82 and 84. With this arrangement simultaneous oscillation of the tubes is possible. When oscillation is occurring, however, and the crystals have different natural frequencies, a particular LC product will, depending upon its value, correspond, in general, to different amplitudes of oscillations of the two tubes. The characteristics of the screen current will be as indicated in Figure 2 or as indicated in Figure 7 which will be more fully described hereafter in conjunction with a later modification. Except for some particular LC value for which the screen currents will be the same, assuming the screen circuits to be identical, the screens will be at different D. C. potentials. The difference in potentials of the screens may be utilizing for control of the direction of operation of the motor 74 which through connection 72 rotates the movable plates of the condenser 70. A polarized relay may be utilized in this case for controlling purposes. This comprises a coil 86 connected between the screens and arranged to control the polarized armature 88 which is arranged to make alternative contact at 90 or 92 to reverse the field of the motor through the field coils 94 and 96. If the screen of tube 66 is at the higher potential, the flow of current will, of course, occur in one direction through the coil 86 and so drive the motor in one direction. On the other hand, if the screen of tube 68 is at the higher potential, this current is reversed to drive the motor in the opposite direction. The motor will thus be controlled to drive the condenser 70 in that direction which will maintain the LC product of the tank circuit at a constant value corresponding to the same potentials of the screens. Of course, the same results are secured even if the two tube circuits are not identical, depending upon the characteristics of the polarized relay. In any event, equilibrium will exist only for a particular LC product. Again, to prevent hunting, it is desirable that the relay be of such type that, for a range about a condition of zero current flow between the screens, contact will be made at neither of the points 90 and 92 so that the motor will have a small range of rest.

The foregoing systems involve rather elaborate electric relay arrangements. A simpler motor control may be secured by the modification illustrated in Figure 6, in which modulation of the high frequency currents is involved.

Figure 6:
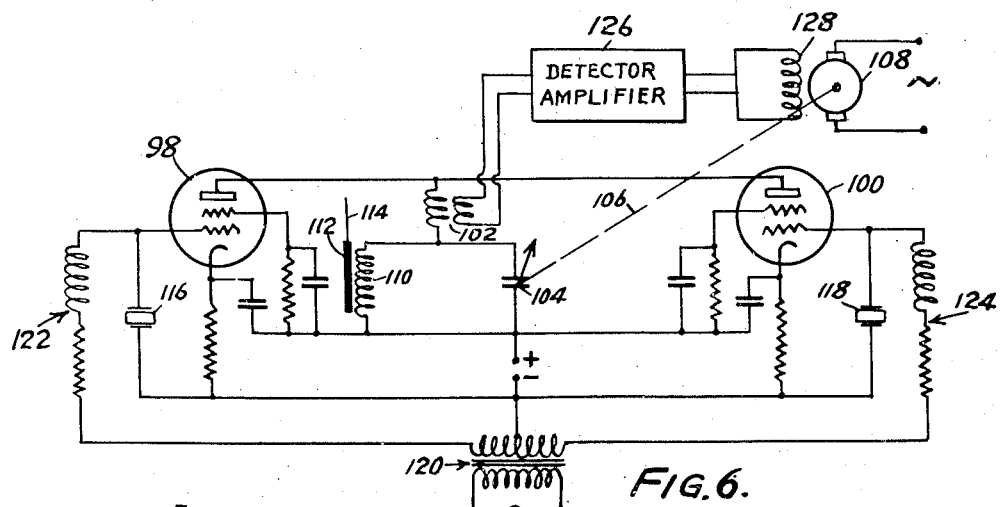
Figure 6 is a diagram illustrating another embodiment of the invention in which an advantageous alternating current type of control is involved.
Figure 8:
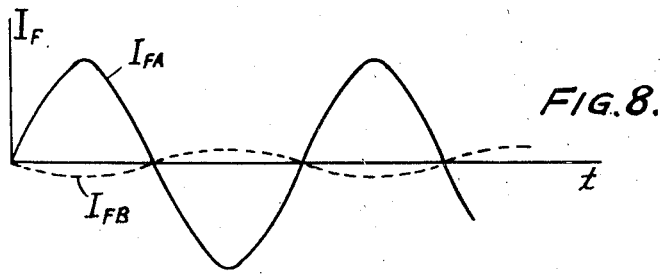
Figures 8 and 9 are graphs illustrating the fashion in which reversing motor control is effected.
Figure 9:
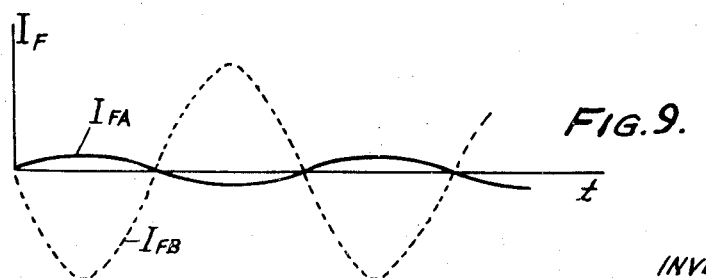

In Figure 6, two tubes 98 and 100 are connected through the primary of a high frequency transformer 102 to a common tank circuit comprising the variable condenser 104 and an inductance 110 consisting of a coil having a powdered iron core 112 connected as previously described through 114 to the motion to be transmitted. Crystals 116 and 118 in the grid circuits of the respective tubes 98 and 100 have definite natural frequencies so related, as indicated in Figure 7, that oscillations of both tubes occur in a common range of LC products. A transformer 120 energized by the commercial frequency supply, for example at 60 cycles, has its secondary connected as indicated to the grids of the respective tubes through the radio frequency choke-grid leak connections indicated at 122 and 124, the center of the secondary being, from the high frequency standpoint, connected to the tank, there being interposed the D. C. high voltage supply. The high frequency outputs of the tubes 98 and 100 are accordingly modulated in opposite phase. The result of this is that the two modulated high frequency outputs will feed, through the high frequency transformer 102, a detector-amplifier 126 of conventional design. There will, accordingly, appear in the field coil of the motor 108, which drives the condenser 104, a low frequency current at the supply frequency, the armature 106 of the motor being supplied with alternating current at the same frequency. Referring to Figures 8 and 9, the field current $I_f$ will have a phase depending upon the LC product. Consider, for example, operation at an LC product less than the value K, as, for example, at $P_1$ in Figure 7. Assume that the screen current characteristic of the tube 98 is, as illustrated in full lines in Figure 7 and the screen current characteristic of 100 is that illustrated in dotted lines. In the case of operation at $P_1$, therefore, the modulated output of the tube 98 will be much greater than that of the tube 100. Accordingly, the field current contributed by the tube 98 indicated at $I_{FA}$ will greatly exceed that at $I_{FB}$ contributed by the tube 100. The result will be a low frequency field current having the phase corresponding to the left hand side of the secondary of the transformer 120. Similarly, operation at P₂ on the opposite side of the value K will give a field current having the phase of the right hand side of the secondary of the transformer 120. This reversal of phase of the field will result in corresponding reversal of motion of the motor 108. When, by the operation of the motor, the LC product attains the value K, the two components of the field current due to the two tubes will balance each other so that the field will be deenergized. It will be evident, therefore, that the condenser 104 will always assume a position, for any particular position of the core 112 such that the motor will not be operated, with the result that the position of the plates of condenser 104 will be indicative of the position of the core 112 and of the variable quantity to which the core position corresponds.

While this last circuit of Figure 6 is somewhat more elaborate, it should be noted that it involves merely the use of a detector-amplifier of conventional vacuum tube type, instead of a mechanical relay. Furthermore, the crystals may have frequencies much more closely approaching each other than in the case of the preceding systems also involving two crystals. This coupled with the sharp response of the oscillations of the crystal oscillators to changes of LC product results in extreme accuracy of positioning of the condenser 104 with respect to positions of the core 112. The signals change very rapidly with variations of the LC product so that the system is very stable resulting in a very sensitive system but one which is less apt to hunt than most sensitive systems.

The further advantage of utilizing a crystal oscillator system lies in the fact that the frequency of oscillation is quite independant of voltage variations and tube characteristics, depending only on the structures of the crystals themselves which, furthermore, are extremely stable against changes in temperature.

As will be evident from the foregoing numerous variations may be made by those skilled in the art in the systems described without departing from the scope of the invention as defined in the following claims.

What I claim and desire by Letters Patent is:

1. A telemetering system comprising a vacuum tube oscillator circuit having resonant components, two of which are of high Q and substantially constant frequency type and another of which has a variable resonant frequency, the last mentioned component including a pair of impedances, means for independently varying one of said impedances, and means responsive to an operating characteristic of said oscillator circuit for varying the other of said impedances to maintain the operating characteristics of said oscillator circuit substantially constant.

2. A telemetering system comprising a vacuum tube oscillator circuit having resonant components, two of which are crystals and another of which has a variable resonant frequency, the last mentioned component including a pair of impedances, means for independently varying one of said impedances, and means responsive to an operating characteristic of said oscillator circuit for varying the other of said impedances to maintain the operating characteristics of said oscillator circuit substantially constant.

3. A telemetering system comprising a vacuum tube oscillator circuit having resonant components, two of which are of high Q and substantially constant frequency type and another of which has a variable resonant frequency, the last mentioned component including a pair of impedances, one of said impedances comprising a coil and an independently variable ferromagnetic core therefor, and means responsive to an operating characteristic of said oscillator circuit for varying the other of said impedances to maintain the operating characteristics of said oscillator circuit substantially constant.

4. A telemetering system comprising a vacuum tube oscillator circuit having resonant components, two of which are of high Q and substantially constant frequency type and another of which has a variable resonant frequency, the last mentioned component including a pair of impedances, one of said impedances comprising a coil and an independently variable powdered iron core therefor, and means responsive to an operating characteristic of said oscillator circuit for varying the other of said impedances to maintain the operating characteristics of said oscillator circuit substantially constant.

5. A telemetering system comprising a vacuum tube oscillator circuit having resonant components, two of which are of high Q and substantially constant frequency type and another of which has a variable resonant frequency, the last mentioned component including a pair of impedances, and means, comprising a reversible motor, responsive to an operating characteristic of said oscillator circuit for varying the other of said impedances to maintain the operating characteristics of said oscillator circuit substantially constant.

6. A telemetering system comprising a vacuum tube oscillator circuit having resonant components, two of which are of high Q and substantially constant frequency type and another of which has a variable resonant frequency, the last mentioned component including a pair of impedances, and means, comprising a relay and a reversible motor, responsive to an operating characteristic of said oscillator circuit for varying the other of said impedances to maintain the operating characteristics of said oscillator circuit substantially constant.

7. A telemetering system comprising a vacuum tube oscillator circuit having a pair of vacuum tubes therein and having resonant components, two of which are of high Q and substantially constant frequency type and are associated respectively with said vacuum tubes, and another of which has a variable resonant frequency, and last mentioned component including a pair of impedances, means for independently varying one of said impedances, and means responsive to an operating characteristic of said oscillator circuit for varying the other of said impedances to maintain the operating characteristics of said oscillator circuit substantially constant.

8. A telemetering system comprising a vacuum tube oscillator circuit having a pair of vacuum tubes therein and having resonant components, two of which are crystals and are associated respectively with said vacuum tubes, and another of which has a variable resonant frequency, the last mentioned component including a pair of impedances, means for independently varying one of said impedances, and means responsive to an operating characteristic of said oscillator circuit for varying the other of said impedances to maintain the operating characteristics of said oscillator circuit substantially constant.

9. A telemetering system comprising a vacuum tube oscillator circuit having resonant components, one of which is of high Q and substantially constant frequency type and another of which has a variable resonant frequency, the last mentioned component including a pair of impedances, means for independently varying one of said impedances, means for effecting low frequency modulation of said circuit so that said circuit delivers an output the modulated phase of which is dependent upon the variable resonant frequency of said last mentioned component, and means responsive to the phase of said output for varying the other of said impedances to maintain the operating characteristics of said oscillator circuit substantially constant.

10. A telemetering system comprising a vacuum tube oscillator circuit having at least two resonant components, one of which is a high Q crystal in the grid circuit of said vacuum tube and the other of which is in an anode circuit of said vacuum tube and has a variable resonant frequency, the last mentioned component including a pair of impedances, means for independently varying one of said impedances, and means responsive to an operating characteristic of said oscillator circuit for varying the other of said impedances to maintain the operating characteristics of said oscillator circuit substantially constant in the region of resonance of said second resonant component at a lower frequency than that corresponding to maximum oscillations in the circuit, so that the value of the last mentioned impedance bears substantially continuously a predetermined relationship to the value of the first mentioned variable impedance.

JOSEPH RAZEK.

REFERENCES CITED

The following references are of record in the file of this patent:

UNITED STATES PATENTS

| Number | Name | Date |
|---|---|---|
| 1,838,084 | Drake | Dec. 29, 1931 |
| 2,354,945 | Cohen et al. | Aug. 1, 1944 |
| 2,354,964 | Ostermann et al. | Aug. 1, 1944 |

FOREIGN PATENTS

| Number | Country | Date |
|---|---|---|
| 750 075 | France | Aug. 3, 1933 |